Sept. 10, 1968     E. R. JABLONSKI     3,400,436
CLAMPING DEVICE
Filed Oct. 12, 1965     2 Sheets-Sheet 1
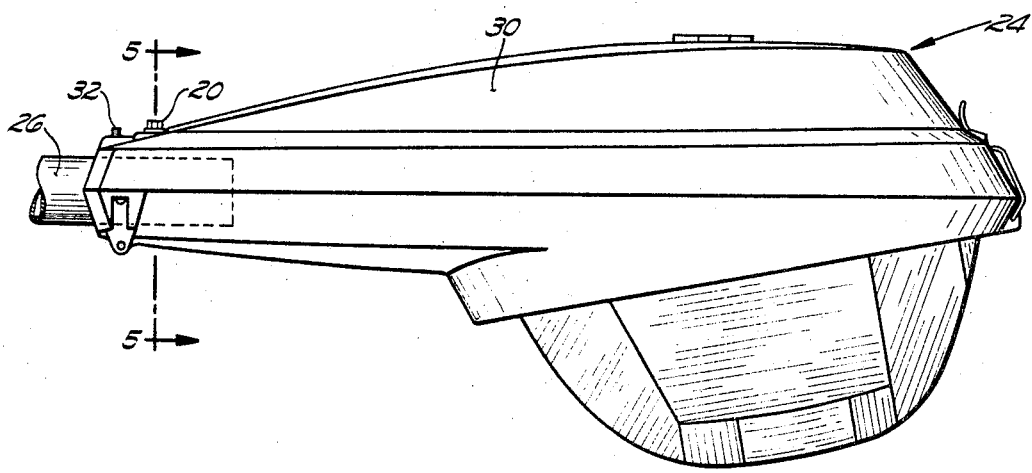
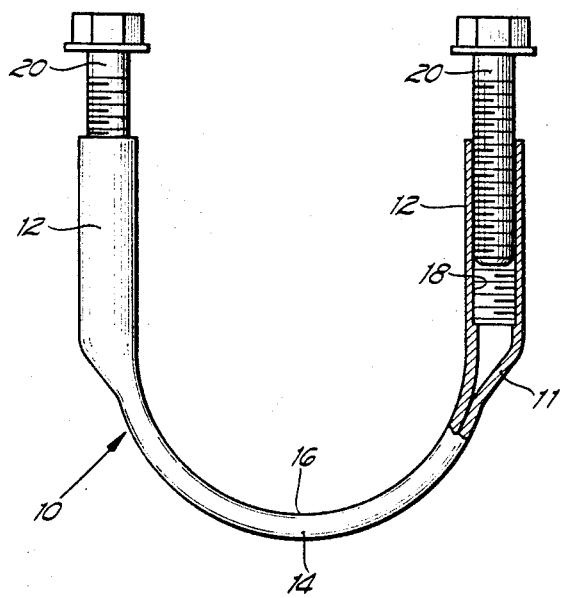
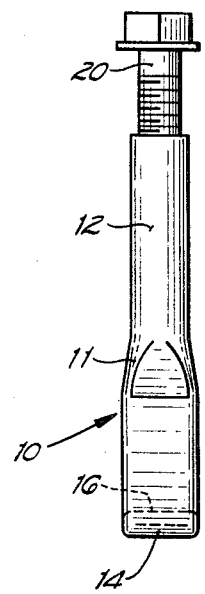
INVENTOR.
Edward R. Jablonski
BY
Robert W. Lahtinen
Attorney Sept. 10, 1968  E. R. JABLONSKI  3,400,436
CLAMPING DEVICE
Filed Oct. 12, 1965  2 Sheets-Sheet 2
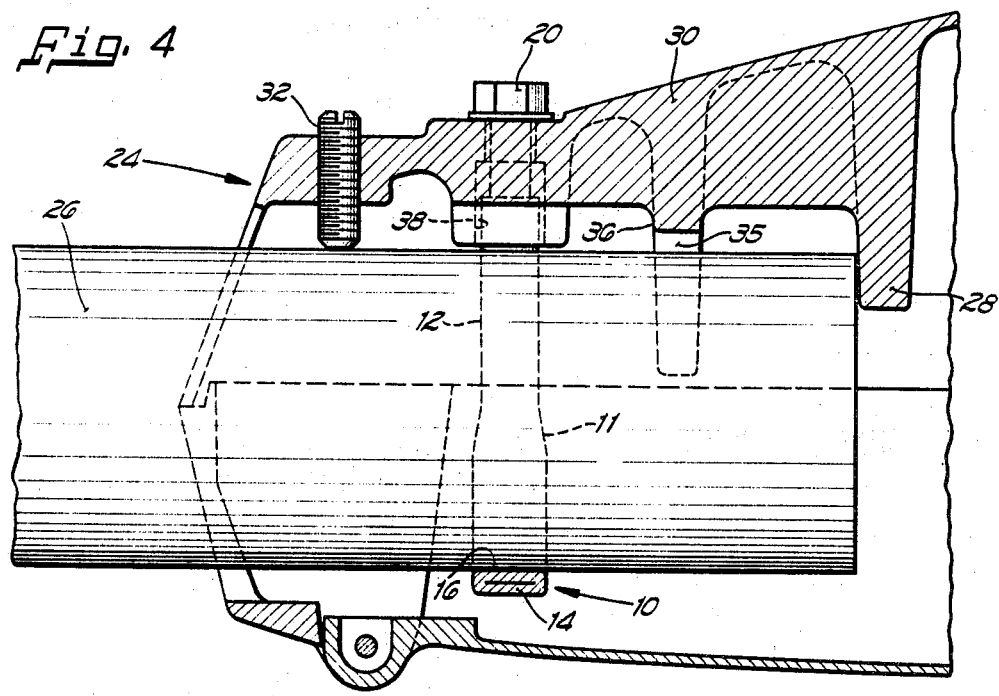
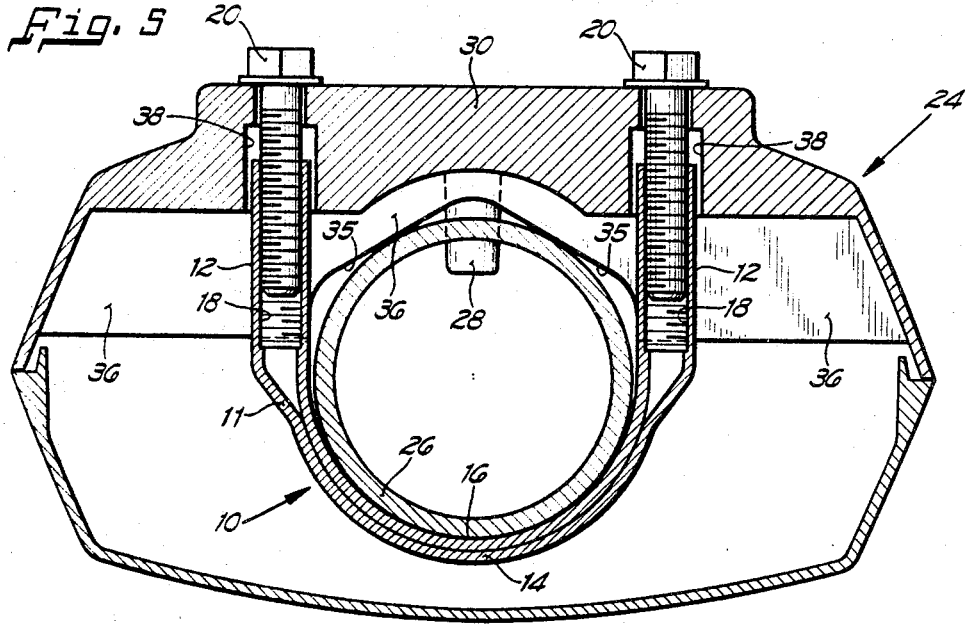
INVENTOR.
Edward R. Jablonski
BY
Robert W. Latimer
Attorney United States Patent Office 3,400,436
Patented Sept. 10, 1968

3,400,436
CLAMPING DEVICE
Edward R. Jablonski, South Milwaukee, Wis., assignor to McGraw-Edison Company, Milwaukee, Wis., a corporation of Delaware
Filed Oct. 12, 1965, Ser. No. 495,219
6 Claims. (Cl. 24—275)

ABSTRACT OF THE DISCLOSURE

A clamp member comprising a generally U-shaped element formed from a length of tubular material with internally threaded tubular leg portions and a bight portion which has been flattened to present a concave, generally semi-cylindrical bearing surface and a pair of bolts respectively received by the threaded leg portions.

Background of the invention

This invention relates to clamping devices and more specifically to an improved clamping member.

One of the most common clamping devices is the U-bolt which has threaded legs, usually parallel, which project through and cooperate with a keeper or other struc- to hold an object captive between the bight portion of the bolt and the cooperating structure when nuts received on the threaded legs are drawn tight.

Although this device is effective and economical to make and install there are some qualities that it would be desirable to overcome. The threaded bolt portions which project beyond the nuts are subject to corrosion, causing this assembly to be difficult to disassemble after having been subjected to corrosive conditions and further the projection of the terminal portions of the legs increase as the nuts are drawn up which may interfere with other structures and exposes a threaded surface which the nut must traverse during disassembly to corrosive action. The common U-bolt is of circular section normally engaging the surface being retained by line contact rather than presenting an appreciable surface. The applicant has provided a simple economical clamping structure utilizing tubing with a flattened bight portion and internally threaded legs that receive bolts to secure the U-shaped member to the cooperating structure. In this device the bolts project further into the tubular legs as the clamp is drawn to a secure position so that no increased projection occurs with respect to any portion of the clamp while the threaded portions of the bolts and tube which have been engaged during assembly remain enclosed. The bolt heads forming the end of the clamp legs may be selected or installed to afford a flush or recessed installation. Also the flattened bight portion provides for surface contact between the clamp and the device to be secured against the bight portion.

It is an object of this invention to provide an improved clamping device.

It is an object of this invention to provide a clamp that affords an enclosure about the engaged threaded surfaces and avoids the necessity of using corrosion resistant nuts and washers.

It is a further object of this invention to provide a U-shaped clamp wherein drawing the device into clamping engagement does not increase the projection of the terminal portions of the clamp.

It is also an object of this invention to provide a clamp having greater surface contact and self-alignment capabilities.

Brief description of the drawings

FIGURE 1 is an elevation view partly in section taken along the axis of curvature of the clamp of this invention;

FIGURE 2 is a side elevation of the clamp of FIGURE 1;

FIGURE 3 is a side elevation of a street lighting luminaire secured to a support arm by the clamp of FIGURE 1;

FIGURE 4 is a vertical section of the left side of the luminaire and arm portion of FIGURE 3; and FIGURE 5 is a section taken along line 5—5 of FIGURE 3.

Description of the preferred embodiment

Referring to the drawings FIGURES 1 and 2 show the U-clamp 10 which is formed of a length of seamless steel tubing 11 which has been bent to form a pair of parallel legs 12 and the bight portion 14. The bight portion has been flattened to form a curved surface 16 about the center of curvature of the bight portion. The parallel legs 12 of the clamp have internally threaded surfaces 18 in which are received a pair of bolts 20.

FIGURE 3 shows the clamps used to secure a street lighting luminaire 24 to a cantilevered support arm 26. The distal end portion of the cantilevered support arm 26 which would usually be supported from a pole (not shown) is received in the end of the luminaire housing 24. The projection of the arm 26 into the housing is limited by abutting engagement with a downwardly depending stop 28 formed as an integral part of the upper housing 30.

The support clamp 10 draws the arm 26 upward into engagement with the adjusting screw 32 and the downwardly facing inclined abutting surfaces 35 of the depending wall 36 to secure the arm and upper housing securely to one another. The legs 12 of the clamp 10 are slidably received in the cylindrical depression 38 in the upper housing to enable the bolt 20 engaging one leg of the clamp to be drawn up snug and thereafter firmly secured by tightening the other bolt 20 which engages the internally threaded surface of the opposite leg 12.

The flattened or collapsed bight portion 14 provides a bearing surface that engages a substantial portion of the circumference of arm 26 to assist in aligning the arm with respect to the upper housing 30 as well as securely connecting the arm and upper housing to one another. The entire length of the bolt 20 which is threadably received in the tube end is enclosed to avoid corrosion of the threaded surfaces that would impair operation during any subsequent disassembly. Using this clamp structure, the housing 10 and arm 26 can be interconnected and the relative positioning therebetween adjusted from the exterior of the housing while drawing up the bolts 20 to securely clamp the U-shaped tubular portion 11 about the arm 26 does not result in an increased projection of the bolt from the upper housing 30.

Although but one embodiment has been shown and described, it will be apparent to those skilled in the art that various changes and modifications may be made therein without departing from the spirit of the invention or from the scope of the appended claims.

I claim:

1. In combination with an elongated member and a device to be secured thereto, a clamping means comprising a hollow U-shaped tubular member having generally parallel leg portions with interior threaded surfaces and a flattened bight portion presenting a bearing surface generally parallel to the axis of curvature of said bight portion; said device presenting a wall with a portion carried thereby having parallel recesses slidably receiving said tubular parallel leg portions; there being apertures in said wall aligned with said recesses; a pair of bolts extending through said apertures and engaging said tubular member threaded portions to draw said U-shaped tubular member towards said wall, said elongated member extending through said U-shaped member to be engaged by said bearing surface and drawn towards said wall.

2. In combination with an elongated member and a device to be secured thereto, a clamping means comprising a hollow U-shaped tubular member having generally parallel leg portions with interior threaded surfaces and a flattened bight portion presenting a bearing surface generally parallel to the axis of curvature of said bight portion; said device presenting a wall with a pair of parallel generally cylindrical depressions formed therein which slidably receive said U-shaped member parallel leg portions; there being apertures in said wall aligned with said cylindrical recesses; a pair of bolts extending through said apertures and engaging said tubular member threaded portions to draw said U-shaped tubular member towards said wall; said elongated member extending through said U-shaped member to be engaged by said bearing surface and drawn toward said wall; said elongated member engaging support portions carried by said wall and disposed at opposite longitudinal sides of said U-shaped member whereby said elongated member is positively secured to said device by tightening said bolts to cause said U-shaped member to clamp said elongated member securely against said support portions.

3. The combination of claim 2 wherein at least one of said support portions is adjustable to vary the distance at which said elongated member is supported from said wall of said device whereby the relative position of said device with respect to said elongated member in the positively secured position can be selectively varied.

4. The combination of claim 3 wherein at least one of said support portions is adjustable from the exterior of said device.

5. A U-shaped clamp comprising a hollow tubular member formed into a generally U-shaped configuration having internally threaded leg portions and a collapsed bight portion presenting a curved bearing surface and a pair of bolts respectively threadably received in said leg portions.

6. A generally U-shaped clamp member comprising a hollow generally U-shaped element formed from a length of tubular material with internally threaded tubular leg portions and a bight portion which has been flattened to present a curved concave generally semi-cylindrical bearing surface and a pair of bolts respectively received by said threaded leg portions.

References Cited
UNITED STATES PATENTS

| | | | |
|---|---|---|---|
| 3,018,081 | 1/1962 | Waldbauer. | |
| 3,142,501 | 7/1964 | Clark et al. | 285—184 |
| 3,184,199 | 5/1965 | Clark et al. | 285—230 |
| 1,568,101 | 1/1926 | Taylor | 248—230 |
| 1,898,640 | 2/1933 | Moss | 248—230 |

DONALD A. GRIFFIN, *Primary Examiner.*